United States Patent
Farley

(10) Patent No.: US 7,155,951 B2
(45) Date of Patent: Jan. 2, 2007

(54) MILL VARIATION CONTROL APPARATUS AND METHOD

(75) Inventor: Thomas William Dashwood Farley, Kidlington (GB)

(73) Assignee: Novelis, Inc., Toronto (CA)

( * ) Notice: Subject to any disclaimer, the term of this patent is extended or adjusted under 35 U.S.C. 154(b) by 343 days.

(21) Appl. No.: 10/450,871

(22) PCT Filed: Dec. 17, 2001

(86) PCT No.: PCT/GB01/05576

§ 371 (c)(1),
(2), (4) Date: Sep. 30, 2003

(87) PCT Pub. No.: WO02/49782

PCT Pub. Date: Jun. 27, 2002

(65) Prior Publication Data
US 2004/0050132 A1    Mar. 18, 2004

(30) Foreign Application Priority Data
Dec. 20, 2000    (EP)    ................... 00311448

(51) Int. Cl.
B21B 39/08    (2006.01)
B21B 37/48    (2006.01)

(52) U.S. Cl. .................. 72/205; 72/246; 72/227; 72/710

(58) Field of Classification Search ............... 72/205, 72/246, 8.6, 11.4, 247, 710
See application file for complete search history.

(56) References Cited

U.S. PATENT DOCUMENTS 3,659,767 A    5/1972    Martin
4,507,946 A *  4/1985   Koyama et al. ............... 72/8.6
5,701,774 A * 12/1997   Imanari et al. ............... 72/8.6
5,724,846 A *  3/1998   Wang et al. ................... 72/237

FOREIGN PATENT DOCUMENTS

| EP | 0585897 | 3/1994 |
|---|---|---|
| JP | 6118658 | 1/1986 |
| JP | 8238511 | 9/1996 |
| NL | 8301497 | 11/1984 |
| WO | WO9627454 | 9/1996 |
| WO | WO0065319 | 11/2000 |

* cited by examiner

Primary Examiner—Dmitry Suhol
(74) Attorney, Agent, or Firm—Cooper & Dunham LLP

(57) ABSTRACT

Apparatus and method for reducing vibration in a mill stand. The apparatus comprises a roll (4) positioned upstream or downstream of the mill stand (1) and over which the strip material (2) being rolled is passed. The vibration control apparatus comprises an inertia element in the form of a flywheel (7) connected to the roll (4) by a stiffness element in the form of a compliant shaft (6). The components (6) and (7) form a mechanical system which can be tuned in such a way as to introduce a speed fluctuation at the roll (4) which exactly matches the speed fluctuation of the strip material as it enters the roll bite. Both the inertia element (7) and stiffness element (6) can take other forms: for example, the stiffness element could be a flexible drive belt or belts; the inertia element could be a shaft about which the roll (4) rotates, via a stiffness element.

11 Claims, 3 Drawing Sheets

MILL VARIATION CONTROL APPARATUS AND METHOD

The present invention relates to mill vibration control apparatus and to a method of restricting vibration in a mill stand.

During cold rolling of metal, a continuous strip of metal is passed through a mill stand so as to reduce the gauge (thickness) of the metal strip. Fundamentally, the mill stand consists of a pair of rolls that, when in use, are separated by a distance slightly less than the desired exit gauge of the metal strip which passes between the rolls. Where the desired gauge of the metal strip is small, closed gap rolling is performed where the surfaces of the rolls are touching outside of the width of the strip and the metal strip is able to pass between the rolls as a result of a slight deflection of the surface of the rolls. Commonly, the mill stand comprises a set of rolls consisting of a pair of small work rolls each of which is in turn in contact with one or more much larger backup rolls. The components of a mill stand have their own natural frequencies of vibration; however, resonant vibrations of the mill stand can develop that negatively affect the quality of the sheet metal being rolled. For example, typically a 10% variation in exit gauge can be caused by gauge chatter that usually develops very quickly and can only be stopped by reducing the speed of the sheet metal through the mill stand. Gauge chatter is a self-excited phenomenon and, once it has developed, it is subject to a feedback mechanism that can result in the vibration building up to unacceptable levels very quickly.

This feedback mechanism is inherent in every rolling mill stand and is illustrated in FIG. 1 schematically. FIG. 1 shows the passage of a strip 2 of metal through two stands, n and n+1, of a multi-stand metal rolling mill. Each stand comprises smaller diameter work rolls 10, between which the strip 2 passes, and each of which is supported by a respective larger diameter backing roll 11. At each stand n, n+1, a change in the rolling load (for example from a change in the hardness of the material being rolled or any other disturbance) produces a change in exit strip thickness, $\delta$(exit gauge). The change in the thickness of the exit strip produces a change of the entry strip speed, $\delta$(entry speed), due to a continuity of mass flow through the mill (mass in=mass out). In turn, the change in entry strip speed causes a consequential change in the tension in the entry strip, $\delta$(entry tension). This arises because if the speed of metal increases at one end relative to the speed at the other end, then the strip will be forced to stretch like a spring and will have a higher tension. Finally, to complete the feedback loop, the change in entry strip tension produces a change in rolling load, $\delta$(rolling load).

This problem becomes more complicated when, as illustrated, there is more than one mill stand in series because the mill vibration can interact via the metal strip joining them. A change in entry tension in stand n+1 is equivalent to a change in exit tension in stand n which will produce a change in rolling load in stand n. A change in exit gauge in stand n will travel with the strip into stand n+1 and produce a change in rolling load in stand n+1.

Currently, the only solution to avoiding gauge chatter or restricting it once the vibration starts to develop, is to restrict the speed with which the metal can be passed through the mill. WO96/27454 provides a mathematical analysis of gauge chatter and proposes the use of one or more additional rolls, close to the roll bite, that roll with the metal strip, thereby inducing a phase change in the mechanical system consisting of the metal strip and the mill stand. The inter-position of the additional roll(s) is said to introduce a phase advance into the feedback mechanism associated with the roll stand, thus stabilising the loop and preventing vibration. This phase advance is achieved by placing the additional roll(s) close to the roll bite, which has the effect of making the stiffness of the strip between the entry roll and the additional roll(s) much smaller than that between the additional roll(s) and the roll bite. In addition, it is stated that the inertia of the additional roll(s) must be such as to introduce the required phase advance. The practical effect of this is to reduce the magnitude of the change in strip entry tension, $\delta$(entry tension), thereby reducing the gain of the total feedback loop and increasing the stability of the mill, allowing higher rolling speeds to be achieved without vibration.

JP08-238511 describes a vibration control apparatus for use in a rolling mill comprising two spaced roll stands. In between the two roll stands the material being rolled is passed over a control roll which is provided with a tension governor to vary the moment of inertia of the roll. The tension governor is realised by a weight which rotates with the roll and whose radius of rotation can be varied. A further roll detects the tension in the material being rolled and the result of this is used to vary the moment of inertia of the control roll.

JP61-18658 describes a vibration absorbing device for use in a strip processing line. The device comprises a vibration-absorbing roll which is resiliently pressed against the strip. Lateral vibration of the strip is inhibited by a controlled lateral movement of the roll.

The present invention seeks to provide an apparatus and a method that reduces vibration in a mill, particularly a metal rolling mill, so as to control gauge chatter and enable metal to be rolled at higher speeds without undesirable vibration building up.

Although described herein exclusively in relation to metal rolling, it is envisaged that the principles of the invention may be applied to other rolling processes that suffer vibration.

In a first aspect the present invention therefore provides mill apparatus for rolling strip material, said apparatus comprising a set of rolls between which the strip material is passed, and vibration control apparatus comprising a roll positioned so that the strip material passes over it at a position upstream or downstream of the set of rolls, said apparatus being characterised in that said vibration control apparatus further comprises an inertia element mechanically connected to the roll via a stiffness element.

In a second aspect, the present invention provides a method of restricting vibration in a rolling mill comprising a set of rolls between which a strip material is passed, said method comprising passing the strip material over a roll positioned upstream or downstream of the set of rolls, said roll being mechanically connected to a vibration control apparatus comprising an inertia element connected to the roll via a stiffness element, and timing the vibration control apparatus to dampen vibration by adjusting the stiffness of the stiffness element and/or the moment of inertia of the inertia element.

The roll may be positioned upstream or downstream of the set of rolls. In the preferred embodiment it is mounted upstream and will thus be referred to hereinafter as an entry roll.

Preferably the arrangement is such that the inertia element is mounted for rotation about an axis which may or may not be coaxial with that of the entry roll and is driven by the entry roll via the stiffness element. By the same token, the ability of the entry roll to react to changes in velocity transmitted to it by the strip—see below—will depend upon the action of the inertia element via the stiffness element.

In the context of the invention, an inertia element is an element, such as a flywheel, that possesses a reasonably high moment of inertia. In particular, the moment of inertia of the inertia element should preferably be higher than that of the entry roll.

A stiffness element is to be considered as an element that resists elastic deformation such as that associated with twisting, stretching or bending. The stiffness element may for example be a torsional stiffness element such as a torsional spring or a compliant shaft. Another example of a suitable stiffness element is a flexible belt or chain.

In an embodiment of the invention, the entry roll is hollow, and the inertia element is mounted coaxially within the entry roll. The entry roll and inertia element may be coaxially mounted for independent rotation about a common shaft, which shaft may itself form the inertia element. The stiffness element is also advantageously mounted within the entry roll, in the annular space between the roll and the inertia element. For example, the stiffness element could take the form of an annular layer of resilient material, such as rubber, mechanically connecting the entry roll and the inertia element. Such a layer could be perforated to reduce its stiffness. Alternatively the stiffness element could take the form of a spring or torsion tube located in the space between the entry roll and the inertia element. In a further alternative, the stiffness element could take the form of spokes extending between the entry roll and the inertia element.

In another embodiment of the invention the inertia element is simply attached coaxially to one end of the entry roll, with a disc of resilient material, such as rubber, sandwiched between the two. The resilient disc thus acts as the stiffness element.

It will thus be seen that the movement of the strip material over the entry roll causes the roll to rotate and this in turn drives the inertia element via the stiffness element. As already discussed, the vibration feedback mechanism results in small cyclic changes in the entry speed, $\delta$(entry speed), of the strip material entering the set of rolls. These small changes of speed are transmitted back through the strip material entering the mill and set up corresponding variations in the speed of rotation of the entry roll. It is advantageous if the entry roll is able to follow these variations reasonably accurately and, for this purpose, it is desirable that the strip material is firmly engaged with the entry roll so that changes of speed are accurately transmitted through to the entry roll. Various means can be used to reduce slippage to a minimum. For example the arc of contact (wrap angle) between the strip material and the roll can be increased, and/or the surface of the roll can be roughened. Keeping the moment of inertia of the entry roll as low as possible also helps the entry roll to follow rapid variations in strip speed.

The vibration control apparatus attempts to transmit the variations in the entry roll speed to the inertia element via the stiffness element. Preferably, the components are tuned in such a way as to introduce a speed fluctuation at the entry roll which exactly matches the speed fluctuation of the strip material as it enters the roll bite, although this condition may not in practice be perfectly achieved. By this means, it is possible to remove, or at least considerably reduce, the mill vibration. This is achieved by tuning the inertia element and stiffness element to a resonant condition somewhat above the frequency of vibration which it is desired to inhibit. In a metal rolling mill this frequency is the natural resonant frequency of the mill stand and is typically in the region of 100 Hz. However, in practice the elements of the vibration control need to be tuned to a somewhat higher frequency, typically between 5% and 60% higher, and more preferably between 10% and 40% higher. A typical resonant frequency for the combined inertia element and stiffness element is about 125 Hz, assuming a natural resonant frequency of the mill stand of 100 Hz.

It will be seen therefore that the effect of the extra components—the inertia element and the stiffness element—is to add an extra resonant frequency to the dynamic response of the whole system. The frequency of this new resonance can be readily tuned by varying the inertia of the inertia element or the stiffness of the stiffness element. By optimising this tuning it is possible to achieve the stability condition in which variations in the velocity of the strip material at the roll bite are in phase with and of equal amplitude to corresponding variations in the strip material as it passes over the entry roll. Vibration control is achieved by means of control of the rotation of the entry roll; the entry roll does not execute any translational movement in a direction lateral to the strip and, indeed, the entry roll may be mounted for rotation about a fixed axis.

One advantage of the present invention is that it will often be possible to retro-fit the vibration control apparatus to an existing mill. This is because many mills already have one or more entry rolls positioned upstream or downstream of the set of rolls. These entry rolls are used for various purposes, the most common being to guide the strip material to the roll bite. Thus an existing entry roll can be adapted as described above by the addition of an inertia element and a stiffness element. If, as is often the case, there are multiple entry rolls, it is preferred that the adaption be carried out on the entry roll closest to the roll bite, since it is desirable that the strip material has a free run between the modified entry roll and the roll bite. However, if the vibration control elements are fitted to an entry roll that is not the nearest to the bite roll, they should still work but perhaps not in so effective a manner, and the parameters (in particular the tuning) of the vibration control elements may have to be adapted to the different circumstances. If the entry roll, and its associated vibration control elements, are to be fitted as a unit to an existing machine (i.e. without using an existing entry roll), it will be understood from the above that it is desirable that the new entry roll be fitted such that it is the closest roll to the roll bite.

It has already been mentioned that it is advantageous for the entry roll used for vibration control to have a reasonably low moment of inertia so that it can follow the variations in the velocity of the strip material as vibration occurs. To this end, it is preferred that the roll is constructed so as to have a low moment of inertia and, in particular is as low in mass as reasonably possible. For example, as an alternative to steel (the normal material), the roll could be wholly or partly made from lightweight plastics material, or a light metal such as aluminium, or a lightweight reinforced material such as a reinforced resin, or carbon fibre. Clearly, considerations of strength would be important when using such materials, particularly considering the high forces involved in a metal rolling mill, and the generally unfavourable environment.

In order that the invention may be better understood, an embodiment thereof will now be described by way of example only and with reference to the accompanying drawings in which:—

Figure 1:
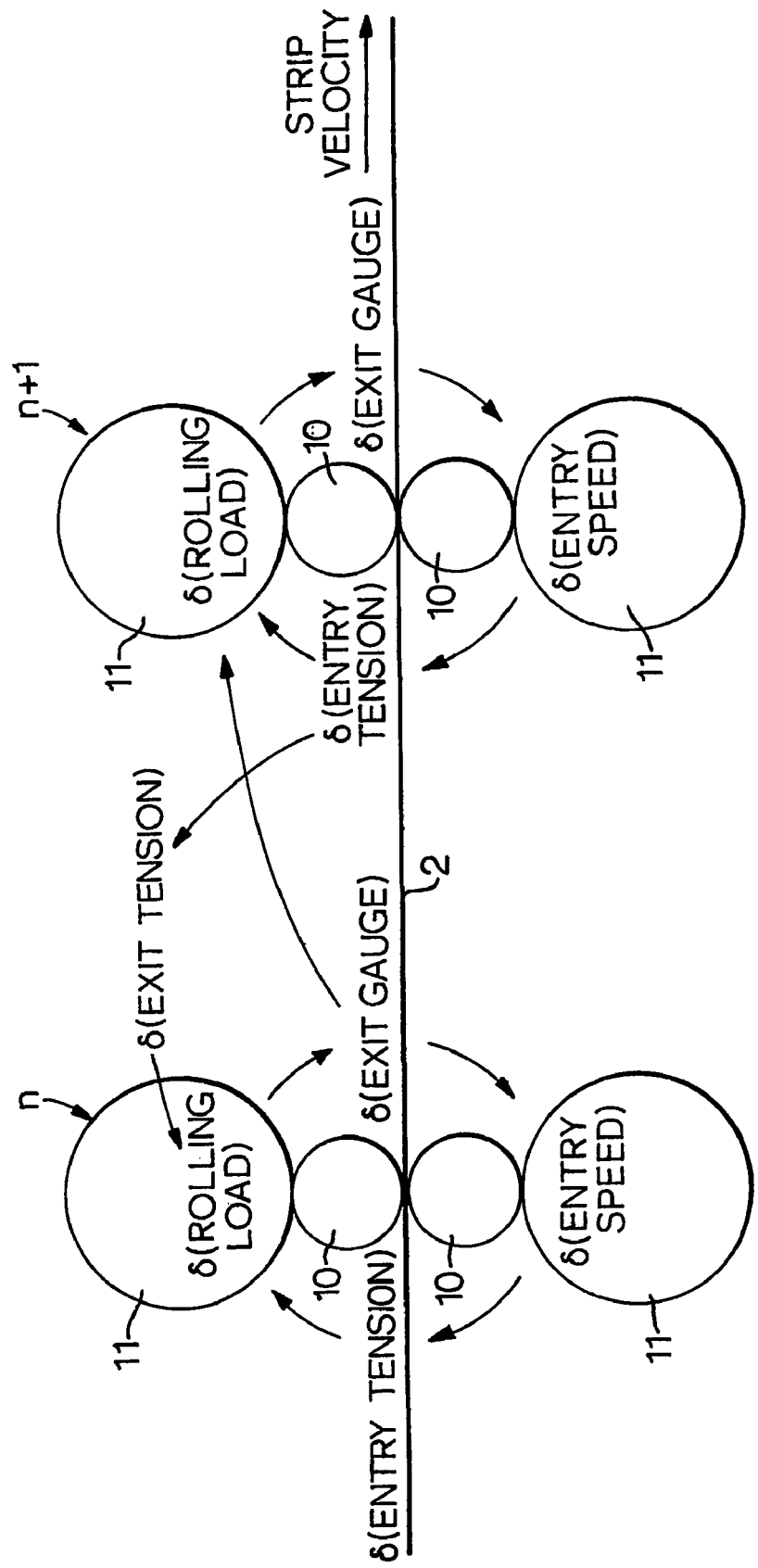
FIG. 1 is a schematic diagram of two conventional mill stands illustrating the self-exciting feedback mechanism that arises with gauge chatter.
Figure 2:
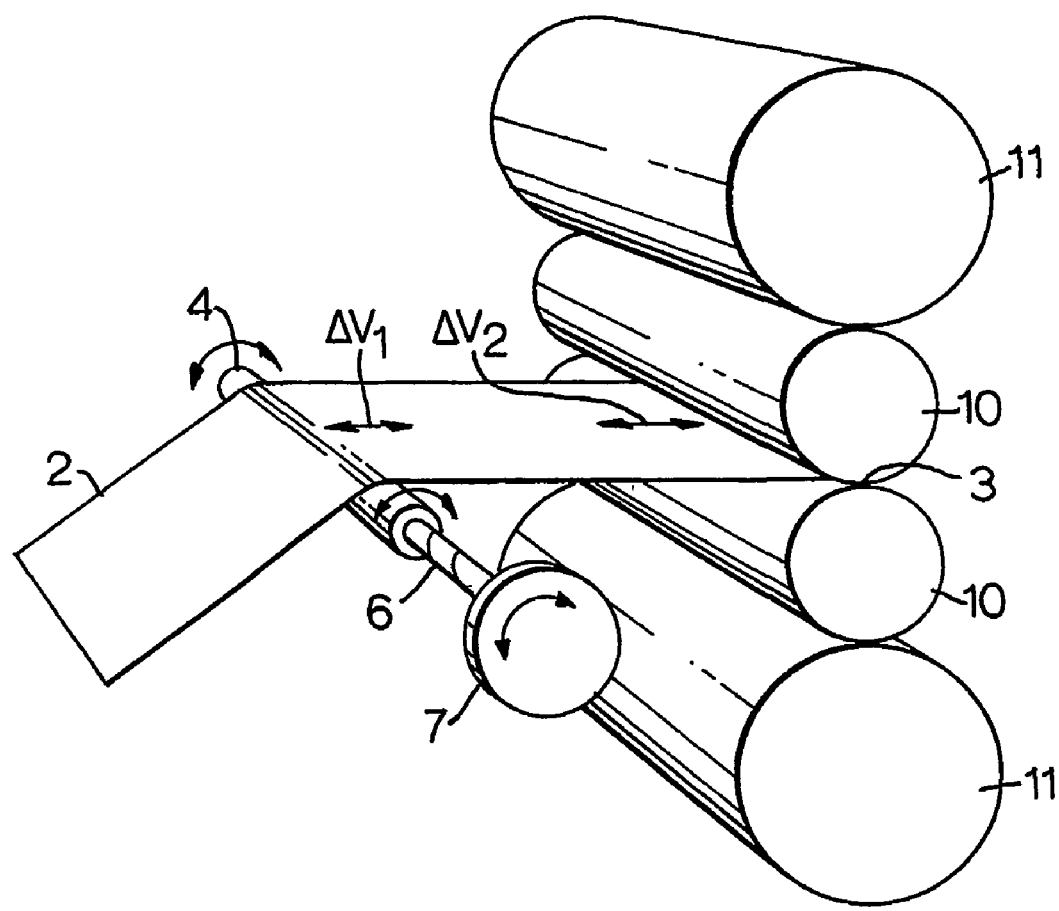
FIGS. 2 and 3 are schematic perspective views, each illustrating a mill stand incorporating a respective embodiment of a vibration control apparatus according to the present invention.

Referring to FIG. 2, it will be seen that a metallic strip material 2 is guided to the roll bite 3 between the work rolls 10 via an upstream entry roll 4. The entry roll bears against the moving strip material 2 and thus moves, or at least attempts to move, therewith.

Fitted to the entry roll 4 is a vibration control apparatus according to the present invention, this comprising a stiffness element in the form of a compliant shaft 6 and an inertia element in the form of a flywheel 7. The flywheel 7 is mechanically connected to the entry roll 4 via the shaft 6 in such a way that, if the compliant shaft was perfectly rigid, the flywheel would rotate with the entry roll 4 and would follow, without any phase change, any variations in the velocity of rotation of the entry roll 4. However, the shaft 6 is not perfectly rigid, and deliberately so since, if it were, the vibration control would be ineffective. Rather, the shaft 6 and flywheel 7 together form a tunable mechanical system which is capable of removing, or at least considerably reducing, the mill vibration.

As has already been discussed in some detail, these variations in the rotational velocity of the entry roll 4 are the result of a vibration feedback loop set up in the mill stand. As the gauge of the exit strip varies, so the variation of entry speed $\Delta V_2$ of strip material entering the work rolls 10 changes in sympathy in a cyclic manner. The change in speed is transmitted upstream to the entry roll 4 where a corresponding variation of velocity $\Delta V_1$ occurs. This variation is in turn transmitted to the entry roll 4 itself due to the rolling contact between the strip material 2 and the entry roll 4. The lower the moment of inertia of the entry roll 4, the more perfectly will the variation of velocity of the strip material be transmitted to the entry roll 4.

Tuning of the compliant shaft 6 and flywheel 7 is achieved by varying the moment of inertia of the flywheel and/or the compliance of the shaft. Means can be provided for altering these parameters so that tuning can be carried out in situ; more likely, however, the parameters will be set in advance for the particular machine to which it is to be fitted, and will remain unchanged while in service.

The tuning is optimised to achieve the stability condition that the variation of velocity $\Delta V_2$ of the strip material 2 at the roll bite 3 moves in phase with and with equal amplitude to, the variation of velocity $\Delta V_1$ of the strip material at the entry roll 4. Under this condition, no stress due to vibration is applied to the portion of the strip material extending from the entry roll 4 to the roll bite 3. In fact, for the purpose of mathematical analysis, the vibration control system can be considered as a series of spring elements, possessing the property of stiffness, interconnecting a series of inertia elements, possessing the property of moment of inertia. Thus, from the roll bite 3, the length of strip 2 between the roll bite and the entry roll 4 can be considered as a spring element, the entry roll 4 as an inertia element, the compliant shaft 6 as a spring element and the flywheel 7 as an inertia element.

Figure 3:
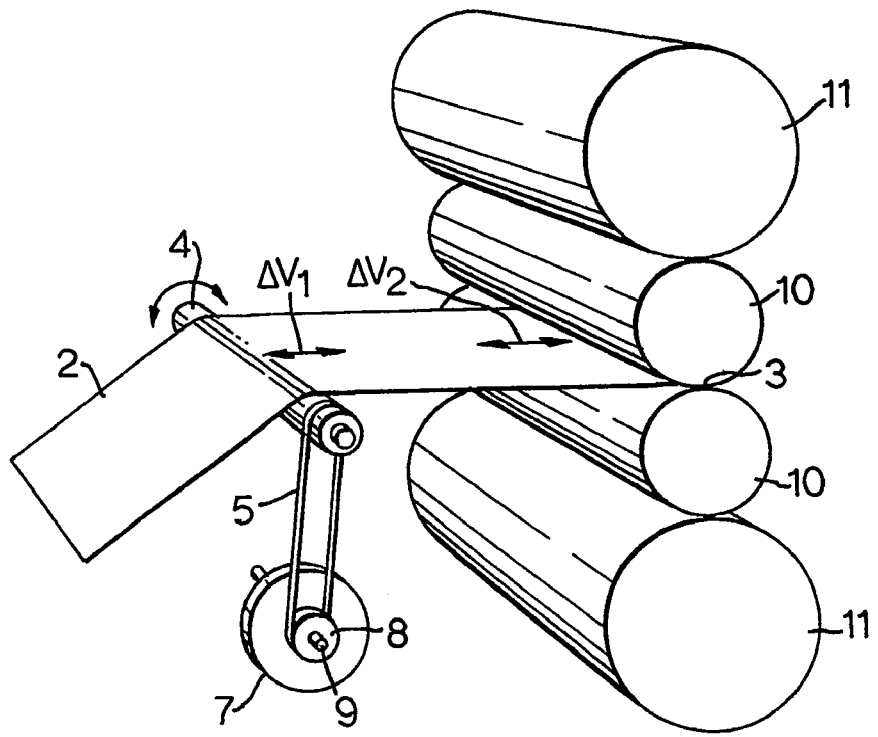

FIG. 3 shows a second embodiment of the invention in which the compliant shaft 6 of the FIG. 2 embodiment is replaced by a belt or chain drive 5. Thus the belt 5 drives a pulley 8 on a separate flywheel shaft 9 and the pulley 8 in turn drives the flywheel 7. The belt 5 is shown driving the entry roll 4 by direct engagement with the outer surface of the roll; in order to avoid wear on the roll, it may be preferred to use a separate coaxial pulley (not shown) rotatably connected with the roll and over which the belt 5 passes. The belt is made of any suitable material such as rubber or steel which is able to give the necessary stiffness. The stiffness of the belt depends on the elastic modulus of the material from which the belt is made and its physical properties, in particular its width, thickness and free length. The free length is that part of the belt which is not in contact with the pulley/roll. For example, a typical belt might be made of steel having a rectangular cross section approximately 1 mm thick and 75 mm wide, and with a total free length of 1 meter (this calculates as 2×500 mm, the latter being the approximate distance between the axis of rotation of the entry roll 4 and that of the shaft 9). In certain circumstances it may be possible to use a toothed belt in order to avoid slippage.

It will be seen that the belt or chain drive 5 acts to provide a stiffness element in the mechanical connection between the entry roll 4 and flywheel 7, due to the elastic properties of the belt or chain.

As well as varying the stiffness of the belt/chain itself, effective stiffness between the entry roll 4 and flywheel 7 can be readily adjusted by changing the number of belts—only one is shown, but the connection could be by way of multiple belts or chains. Also, if necessary, the flywheel 7 can be completely decoupled, thus effectively de-activating the vibration control apparatus, by simply decoupling the belt or belts.

The effective moment of inertia of the flywheel can also be varied by varying the gear ratio between the entry roll 4 and the flywheel 7.

Figure 4:
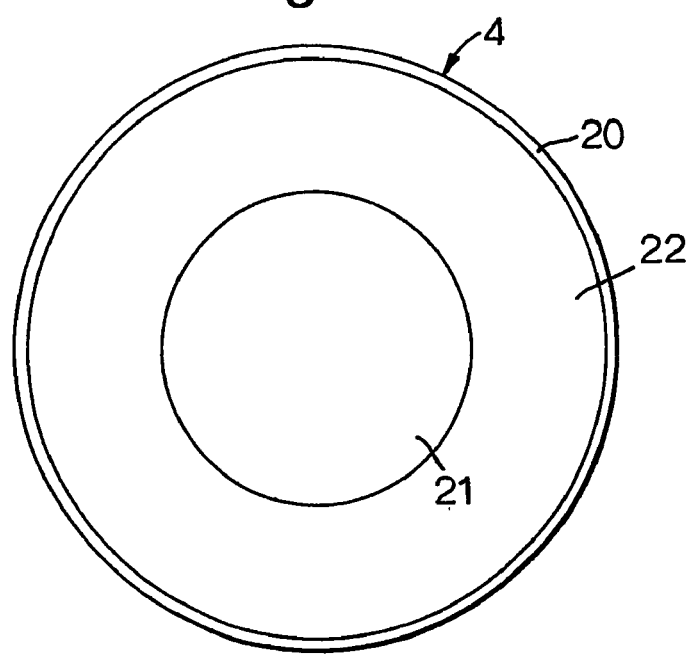
FIG. 4 is a schematic end view of the entry roll showing an alternative way of fitting the vibration control elements.

FIG. 4 shows a third embodiment of the invention; in FIG. 4, only the entry roll 4 is shown, the remaining components of the mill stand being similar to the arrangements discussed previously.

In FIG. 4, the entry roll 4 takes the form of a hollow cylinder 20 over which the strip material 2 passes, the cylinder being freely rotatably mounted by means (not shown) so as to be able to rotate in response to the movement of the strip material 2 over it. Mounted within the cylinder 20, and coaxial therewith, is an inner cylindrical body 21. The cylindrical body 21 may be a solid cylinder, as shown, or may itself be hollow. Extending between the cylinder 20 and the inner body 21 is an annular layer 22 of resilient material, such as rubber.

It will be seen that, in this embodiment, the layer 22 of resilient material and the inner body 21 act as the stiffness element and inertia element respectively of a mechanical system which can be tuned to achieve vibration control. Tuning in this case is effected by choice of the stiffness of the resilient material used for layer 22, or its radial thickness, or by altering the moment of inertia of the inner body 21. The resilient layer 22 is shown as being solid, but it could be perforated in some way which would have the effect of reducing its stiffness.

One advantage of the invention described herein is that it can be readily applied to an existing mill without necessarily having to modify the position or moment of inertia of the entry roll or rolls. To this end, the vibration control apparatus can be added to an existing entry roll, preferably that closest to the roll bite, without the need for extensive modification. Alternatively, a new entry roll, together with the vibration control elements can be fitted to a new or existing mill stand. With a new installation, attention can be paid to the entry roll to keep its moment of inertia as low as practicable. Also, the new entry roll can be positioned such that, between itself and the roll bite, the strip material is substantially free of any components such as deflector rolls, bridle rolls, or colour rolls which contact the strip material. This ensures that the full effect of the vibration control apparatus is felt.

The invention claimed is:

1. Mill apparatus for rolling strip material, said apparatus comprising a set of rolls between which the strip material is passed, and vibration control apparatus comprising a roll positioned so that the strip material passes over it at a position upstream or downstream of the set of rolls, said apparatus being characterised in that said roll is mounted for rotation about a fixed axis and in that said vibration control apparatus further comprises an inertia element mounted for rotation about a fixed axis which is coaxial with that of the roll, said inertia element being mechanically connected to the roll via a stiffness element, such that the inertia element is driven by the roll via the stiffness element.

2. A mill apparatus as claimed in claim 1 wherein the arrangement is such that, as the strip material passes over the roll, there is engagement between the strip material and the roll sufficient to substantially eliminate slippage between the two.

3. A mill apparatus as claimed in claim 1 wherein the stiffness element comprises a torsional element.

4. A mill apparatus as claimed in claim 3 wherein the stiffness element comprises a compliant shaft.

5. A mill apparatus as claimed in claim 3 wherein the stiffness element comprises a torsional spring.

6. A mill apparatus as claimed in claim 1 wherein the inertia element comprises a flywheel.

7. A mill apparatus as claimed in claim 1 wherein the moment of inertia of the inertia element is greater than that of the roll.

8. A mill apparatus as claimed in claim 1 wherein said roll is positioned such that, between it and the entry bite, the strip material is substantially free.

9. A mill apparatus as claimed in claim 1 wherein the strip material is metallic.

10. A mill apparatus as claimed in claim 1 wherein the combined inertia element and stiffness element are tuned to a resonant condition above the frequency of vibration which it is desired to inhibit.

11. A mill apparatus as claimed in claim 10 wherein the resonant frequency of the combined inertia element and stiffness element is between 10% and 40% higher than the frequency of vibration which it is desired to inhibit.

* * * * *